Figure 1:
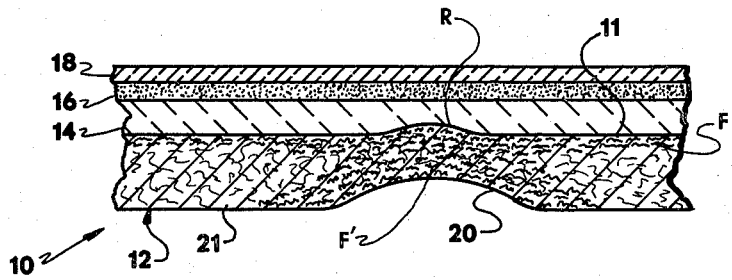

United States Patent [19]

Carlson

[11] 4,220,490
[45] Sep. 2, 1980

[54] METHOD OF MAKING A LAMINATE WITH REMOVABLE SCORED PAPER BACKING

[75] Inventor: Russell L. Carlson, Tallmadge, Ohio

[73] Assignee: Morgan Adhesives Company, Stow, Ohio

[21] Appl. No.: 17,500

[22] Filed: Mar. 5, 1979

[51] Int. Cl.² .......................... B32B 31/00; B65C 9/25
[52] U.S. Cl. .................................... 156/257; 156/324
[58] Field of Search ........................ 156/257, 289, 324

[56] References Cited

U.S. PATENT DOCUMENTS

| 3,719,548 | 3/1973 | Keck | 156/257 |
| 3,859,157 | 1/1975 | Morgan | 156/268 |

Primary Examiner—Douglas J. Drummond
Attorney, Agent, or Firm—Oldham, Oldham, Hudak & Weber Co.

[57] ABSTRACT

A method of making a laminate from a fibrous paper layer laminated to a face sheet and usually used in making labels, which method comprises obtaining a paper backing layer that has one face surface and a second surface which is porous, which paper layer preferably has a moisture content of between about 3.5 and 7.0 percent by weight, forming score lines in the second surface of the paper backing layer while supporting the layer from its said one face surface, then applying a liquid release layer to the face surface of the backing paper, drying; and, providing adhesive and face sheet layers on the release coated paper to complete the laminate.

6 Claims, 3 Drawing Figures

U.S. Patent     Sep. 2, 1980     4,220,490

METHOD OF MAKING A LAMINATE WITH REMOVABLE SCORED PAPER BACKING

BACKGROUND OF THE INVENTION

Heretofore there have been a number of different commerical processes and products developed relating to a pressure sensitive adhesive laminate and to the provision of splitless releasable liner or backing sheets positioned on such laminates.

In one patent on a method of making a paper laminate having appreciably compacted score lines in connection with achieving a splitless release liner or backing, Morgan U.S. Pat. No. 3,859,157, the inventor is concerned about the humidity of the atmosphere surrounding the apparatus when the release liner is compacted. The inventor controls the humidity in the enviornment after the backing paper has been coated with a release material and dried and when the paper is then exposed to humid air so that the paper is rehumidified and stabilized at about 50% relative humidity prior to compaction. After compaction is made under these controlled conditions, a face sheet having a layer of pressure sensitive adhesive thereon is laminated onto the release coated surface of the backing paper.

However, it heretofore has been found to be very difficult, if not impossible, to use all desirable types of face layers in making the laminate of U.S. Pat. No. 3,859,157. This is because the adhesive is applied to the face sheet and it is difficult to apply adhesive directly to a metallic or plastic face sheet under the normal state of the art. Irregularities, slipping, distortion of the face sheet, etc. are some of the problems encountered in coating metallic or plastic face sheets with adhesive. Hence, the prior art has taught the concept of coating the release paper with adhesive and transferring this to the face sheet during lamination, but this is not taught or suggested in U.S. Pat. No. 3,859,157. Also, the paper score lines may show through in the completed laminate, especially with plastic film face sheets.

OTHER PRIOR ART

Keck U.S. Pat. No. 3,719,548 shows processing of clay coated Kraft tag stock of 78 lbs. per ream and it scores this paper on the release coated side in making laminated label stock. The patent also teaches that strain applied from the opposite side (of the paper) from the release coating often ruptures otherwise suitable release coatings.

U.S. Pat. No. 4,080,878, issued Mar. 28, 1978, is on apparatus for scoring release liners for pressure-sensitive adhesive carrying substrates. The patent states (in referring to the prior art) that a web of liner is first scored and then assembled with adhesive and substrate. It has no details about the type of paper used, or when any release coating is applied; and it refers to several prior art patents that have some teaching of the web of a liner being first scored in making up some type of an adhesive carrying laminate. In looking specifically at such reference patents, Starr U.S. Pat. No. 2,319,272 is mentioned and it shows a rubber laminate patch wherein a cover sheet is scored by cutting or the like before or after it is placed in the laminate. Such sheet 16 is made from Holland fabric, cellophane, cellulose, etc. This layer is applied as a temporary cover sheet on a rubber patch and it preferably is provided with a weakened portion in the form of a score line extending across the exposed or outer surface thereof.

Reference also is made to Brady U.S. Pat. No. 2,434,545 and Brady U.S. Pat. No. 2,681,732. Both of these patents show a scored backing board in an adhesive tape label dispenser unit. These boards are defined as being resilient, but somewhat brittle and they can be made, for example, of sheet vulcanized fiber or resin bonded pulp, etc. No teaching of details re the adhesive or release coating method steps are provided, and it has no teachings re papers suitable for use in making printable products with removable backing layers.

OBJECTS OF THE PRESENT INVENTION

The general object of the present invention is to provide a novel and improved method of making label type laminates including face sheets secured in place by pressure sensitive adhesives and having a splitless liner.

Other objects of the invention are to avoid deposit of release material onto paper scoring apparatus; and to use the release material layer to aid in providing a uniform thickness paper-release coated laminate; and to avoid irregularities in the finished laminate and to minimize or eliminate any showing of score lines in the completed laminate or in labels made therefrom.

Still another object of the invention is to roll or score a paper release liner by effecting appreciable compaction without cutting to provide an embrittled or stressed linear area therein prior to applying any release coating material on the paper, and to improve the quality of the laminate produced.

The foregoing and other objects and advantages of the present invention will be made more apparent as the specification proceeds.

Figure 2A:
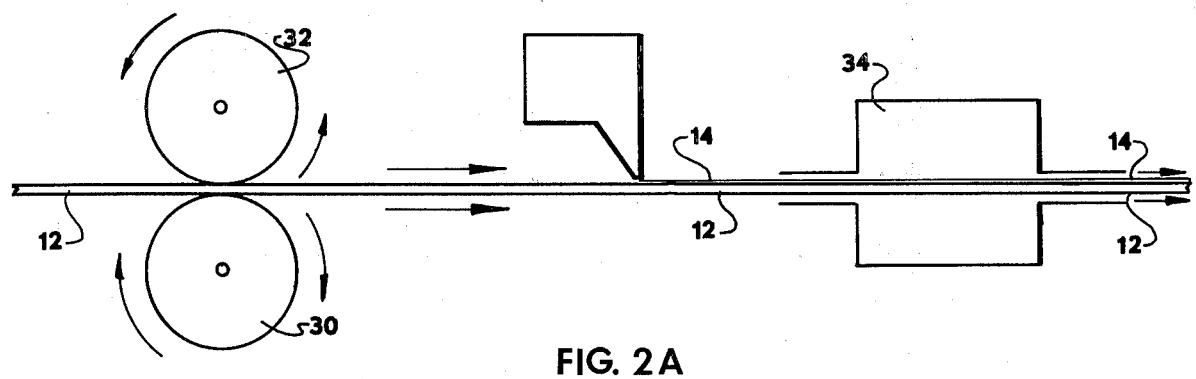
Figure 2B:
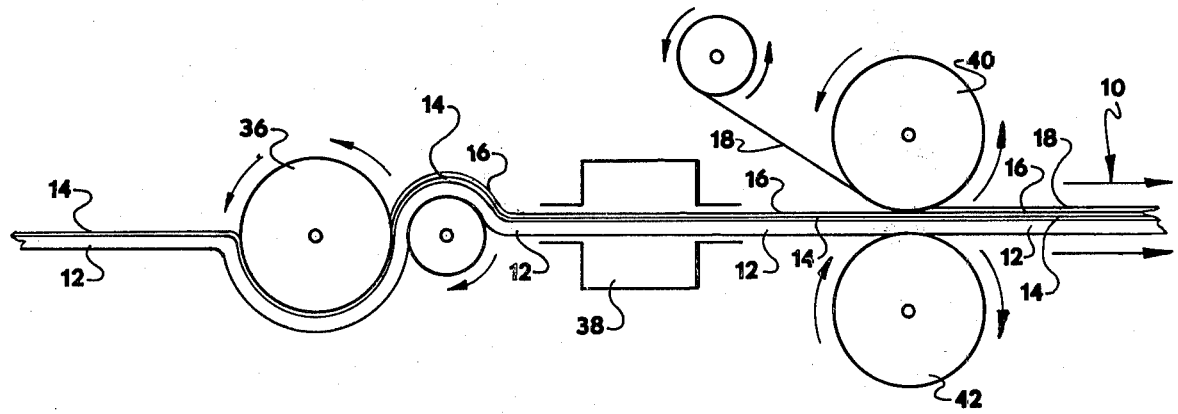

Reference now is directed to the accompanying drawings, wherein:

FIG. 1 is a fragmentary vertical section through a laminate of the invention which laminate may be used in making a label; and FIGS. 2A and 2B are diagrammatic views showing the method of making the laminate of the invention.

When referring to corresponding members shown in the drawings and referred to in the specification, corresponding numerals are used to facilitate comparison therebetween.

It should also be realized that the various layers and laminates in the laminate of the invention are shown of exaggerated size and thickness in the accompanying drawings for clarity and that substantially all of such layers are quite thin, such as from 0.001 inch or less in thickness up to a thickness, for example, of about 0.003 to 0.010 inch for the paper backing layer of the laminate.

A laminate of the invention, as used in forming labels or the like, is indicated as a whole by the numeral 10 in FIG. 1 and this laminate comprises an adhesive layer containing laminate wherein a splitless, releasable liner or backing sheet 12 is present and it is of a relatively uncompacted porous paper with a very smooth coating or facing on one surface thereof as hereinafter described. A layer of a conventional release material 14 is present on the smooth surface. The release layer 14 is in contact with a layer of pressure sensitive adhesive 16 that is of conventional composition and the laminate 10 is completed by a face layer 18 in contact with the adhesive layer 16. The face layer is usually made of paper or of plastic film, such as vinyl, or a metal film, and such films may be transparent, translucent or opaque.

This backing layer 12 preferably is formed of paper having particular specifications and preferably porous machine glazed paper layer 12 has one or more individual surface coatings or layers thereon to provide a very smooth surface on what is the inner face of this paper layer 12. The paper 12 usually is made with a machine glazed inner surface 11 and clay containing coatings are applied to such glazed surface.

It is desirable that a smooth coated face be provided on the paper 12 to receive the surface sealing and silicone release coating thereon and that the paper be non-super calendered. Such non-compacted construction or body of the paper permits the paper to be scored, substantially compacted, and/or compressed, to provide break or tear lines in the paper. This paper layer 12, after it is received from the factory, has the desired splitless tear or score lines 20 provided therein on a porous surface 21 of the paper before any other processing thereof. These lines 20 can have any suitable spacing and normally extend the length of the paper laminate 10. The scoring can be made in any conventional manner by use of known means, but it is very important that this scoring provide an appreciably compressed or compacted line in the paper, which scoring may be provided, if desired, by use of known members, such as the apparatus disclosed in U.S. Pat. No. 4,080,878 and wherein the scoring pressure is accurately controlled. The scoring usually is provided by individual rolls in pressure contact with the paper and having the paper pass over to be supported by a back-roll as pressure is applied by the scoring roll on the opposite face of the paper from the glazed surface. The amount of pressure applied by the scoring roll may have to be experimentally determined based upon the particular thickness of the paper used and the radius of the blunted roll, but this can be easily determined on the job so that the paper cracks or fractures easily along the score line when bent. In essence, I have found that the pressure is about 10% to 15% less than the amount which will effect a crush or burst cutting of the paper, or an actual fracture be caused by the roller. Under this type of controlled pressure, it is believed that in the machine glazed sheet, the roller will initially compress the paper to about ½ or less of its original thickness but the elasticity of the paper will cause it to spring back or return to between about 80% to 90% of its original thickness. That is, the scoring or indentation remaining in the paper is in the vicinity of 20% of its original thickness. By folding or cracking the laminate toward the face sheet on the score line 20, the paper readily fractures or cracks at such compacted area.

The drawings in FIGS. 2A and 2B show what can be conventional apparatus used for producing a multilayer laminate of the invention. FIG. 2A shows a paper layer 12 as it first moves into the processing apparatus is scored on one face thereof by a scoring roll 30 while supported or reinforced on its opposite surface by a suitable back-up roll 32. These rolls are of any known type and build up of release material on the back-up roll 32 is avoided by scoring the paper as received from its manufacturer. Next, the release coating material that forms the ultimate release coating layer 14 on the porous surface 11 of the paper layer 12 in the laminate is applied by a conventional doctor knife or other equipment. The paper then moves into a suitable dryer oven 34 maintained at an appropriate temperature and being of a length in relation to the speed of movement of the paper 12 to have the release coat dry satisfactorily therein. The release coating material is of a nature and composition and is applied as a sufficiently thick layer as to normally cover any ridge as at R, FIG. 1, protruding up from the plane of the paper sheet or layer. An a substantially flat upper surface is obtained on the release covered paper. The ridge R is a result of the scoring of the paper 12.

Next the paper 12 with release coat dried is fed into a suitable adhesive coating unit 36 that applies a layer adhesive to the paper 12 on the release coated surface thereof. This coated sheet may or may not be dried as for example by a drying oven 38 of appropriate operative characteristics and design as to dry the adhesive coating or render it suitably tacky. Next the adhesive coated release sheet 12 is fed to a pair of laminating rolls 40 and 42 which squeeze the adhesive coated layer of sheet 12 against the face sheet 18 thereby transferring the adhesive layer to the sheet 18 and forming the complete laminate of the invention, as indicated at 10 in FIG. 4. If desired, the adhesive layer could be formed on the face sheet prior to lamination.

Other known adhesives may be used, such as hot melt process adhesive or radiation curable adhesives, in place of the pressure sensitive adhesive of layer 16. Any suitable face sheet layer may be used but very desirable products are obtained when using vinyl, paper or metal films as no ridge R or other portion of the score line 20 usually would be visible through the face sheet.

Reference is again made to FIG. 1 that shows the paper fibers F as being compacted and being close together at the surface 11 to form an embrittled area in the paper. Other internal fibers F' in the paper, at the area between the score lines 20 and the surface 11 have, it is believed, been drawn or displaced slightly in such area to be inclined towards the surface 11 and/or to have some residual compaction from the scoring action. In other words, the paper is denser at the areas below the score lines 20. The paper layer 12 preferably is relatively porous and is of greater porosity at areas spaced from the machine glazed surface 11 and from the score line 20. The embrittled surface 11 will, it is thought, tear or separate last as the laminate is bent up on itself towards the face layer.

The paper layer 12, as used in practice of the invention, should have a moisture content of between 3.5 and 7.0% by weight to obtain effective score lines therein.

Improved laminates and labels or other products therefrom that are easy to strip and use have been provided by the invention. Furthermore, processing and scoring of the backing paper layer is facilitated, and an improved release coated backing paper unit is obtained whereby the objects thereof have been achieved.

While one complete embodiment of the invention has been disclosed herein, it will be appreciated that modification of this particular embodiment of the invention may be restored to without departing from the scope of the invention.

What is claimed is:

1. A method of making laminate for use in making a label or the like from a fibrous paper backing layer having one porous surface, which layer is laminated to a face sheet and comprising forming scored linear areas in the said surface of said paper backing layer by appreciable compaction of the paper to provide embrittlement in said scored linear areas while supporting the layer from its other surface, thereafter applying a liquid release layer to said other surface of said backing paper and drying such layer, applying a pressure sensitive adhesive layer to said release layer and drying, providing a moisture content in said backing layer of between 3.5 to 7.0% by weight, and laminating a face sheet to said adhesive layer.

2. A method of making a laminate as in claim 1 and including applying a release layer to said other surface so as to cover any ridges formed in such surface by score lines and obtaining a continuous paper layer-release layer of substantially uniform thickness in the laminate.

3. A method of making a laminate as in claim 1 and comprising forming the backing layer from a relatively porous machine glazed paper having a smooth said other surface.

4. A method of making laminate for use in making a label or the like from a fibrous paper backing layer laminated to a printable face sheet and comprising obtaining a paper backing layer having one face surface and a second surface that is porous and uncoated, applying a rolling pressure on the second surface of said paper layer to form score lines in the second surface of said paper backing layer by compaction of the paper to provide embrittled linear areas, thereafter applying a liquid release layer to said face surface of said backing paper and drying such layer, and laminating an adhesive layer and a face sheet to said release layer to form a laminate.

5. A method as in claim 4 where said paper layer is provided with a moisture content of between 3.5 to 7.0% by weight, and said paper layer is a machine glazed paper that is porous and uncompacted but has a clay coating on said face surface.

6. A method as in claim 4 where said paper layer is biased against its one face surface when rolling pressure is applied to its second surface.

* * * * *